No. 635,087. Patented Oct. 17, 1899.
F. H. BASCOM.
MACHINE FOR MEASURING AND CUTTING GOODS FROM ROLLS.
(Application filed Dec. 8, 1897.)
(No Model.) 4 Sheets—Sheet 2.

Witnesses
Inventor
Frederick H. Bascom
By James Shepard.
Atty.

No. 635,087. Patented Oct. 17, 1899.
F. H. BASCOM.
MACHINE FOR MEASURING AND CUTTING GOODS FROM ROLLS.
(Application filed Dec. 8, 1897.)
(No Model.) 4 Sheets—Sheet 3.
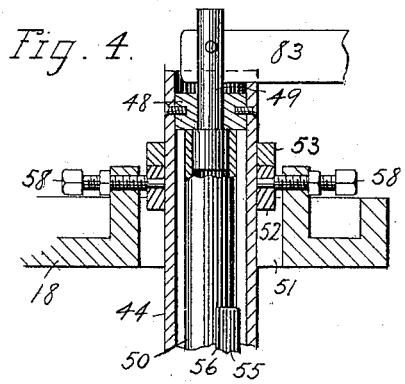
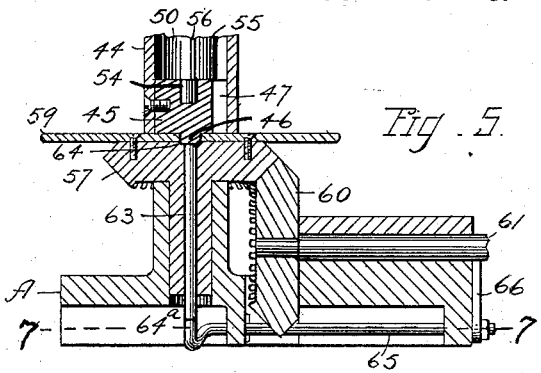
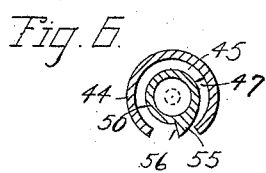
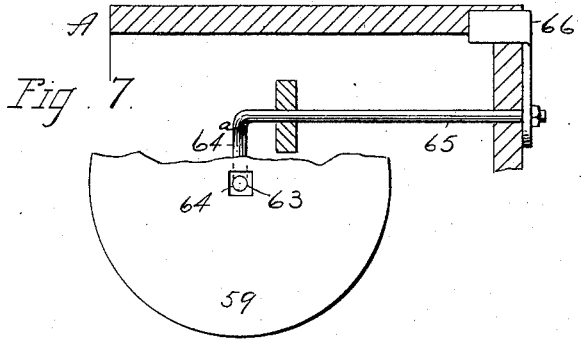
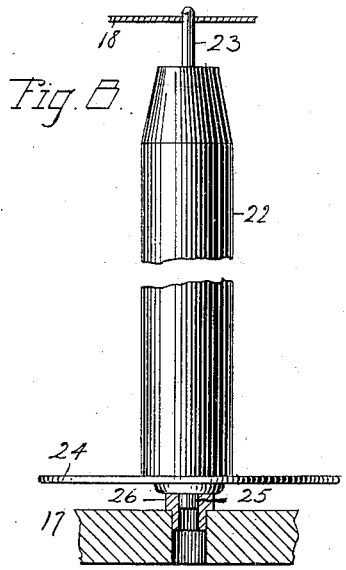
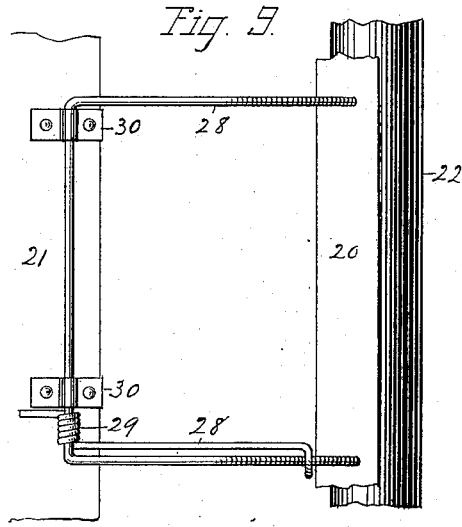
Witnesses
Inventor
Frederick H. Bascom
By James Shepard.
Atty.

No. 635,087. Patented Oct. 17, 1899.
F. H. BASCOM.
MACHINE FOR MEASURING AND CUTTING GOODS FROM ROLLS.
(Application filed Dec. 8, 1897.)
(No Model.) 4 Sheets—Sheet 4.
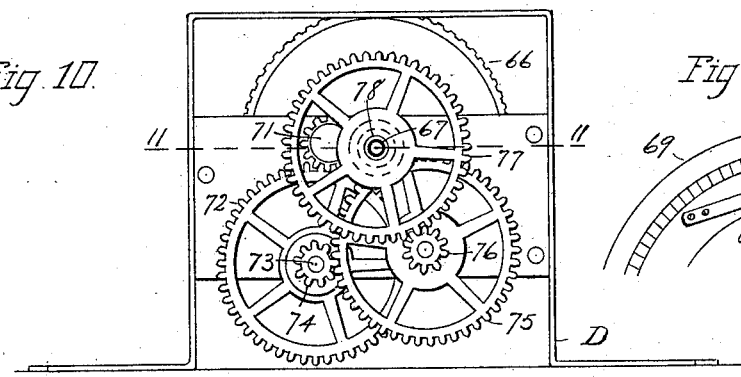
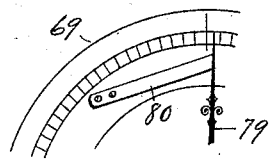
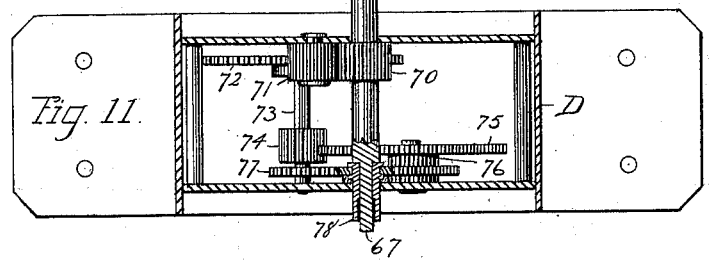
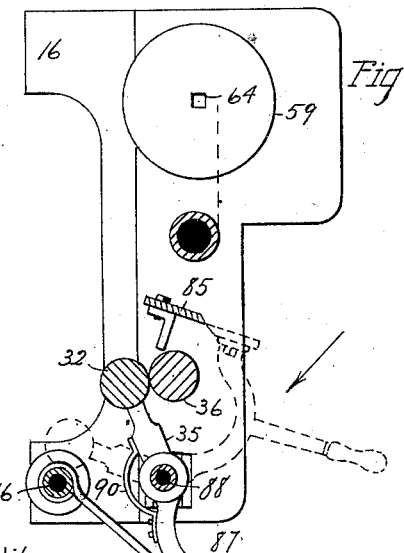
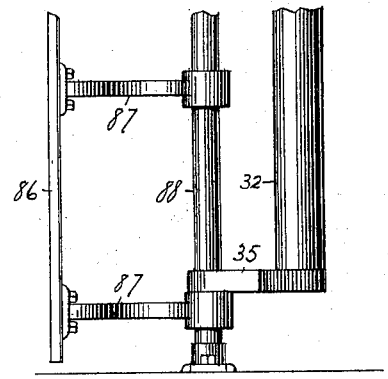
Witnesses
Geo. Stipek
P. J. Egan
Inventor
Frederick H. Bascom
By James Shepard.
Atty.

UNITED STATES PATENT OFFICE.

FREDERICK H. BASCOM, OF LAS CRUCES, TERRITORY OF NEW MEXICO.

MACHINE FOR MEASURING AND CUTTING GOODS FROM ROLLS.

SPECIFICATION forming part of Letters Patent No. 635,087, dated October 17, 1899.

Application filed December 8, 1897. Serial No. 661,122. (No model.)

*To all whom it may concern:*

Be it known that I, FREDERICK H. BASCOM, a citizen of the United States, residing at Las Cruces, in the county of Donna Ana and Territory of New Mexico, have invented certain new and useful Improvements in Machines for Measuring and Cutting Goods from Rolls, of which the following is a specification.

My invention relates to machines for measuring and cutting wire-cloth or other goods from the roll; and the main object of my improvements is efficiency and convenience in operation.

Figure 1:
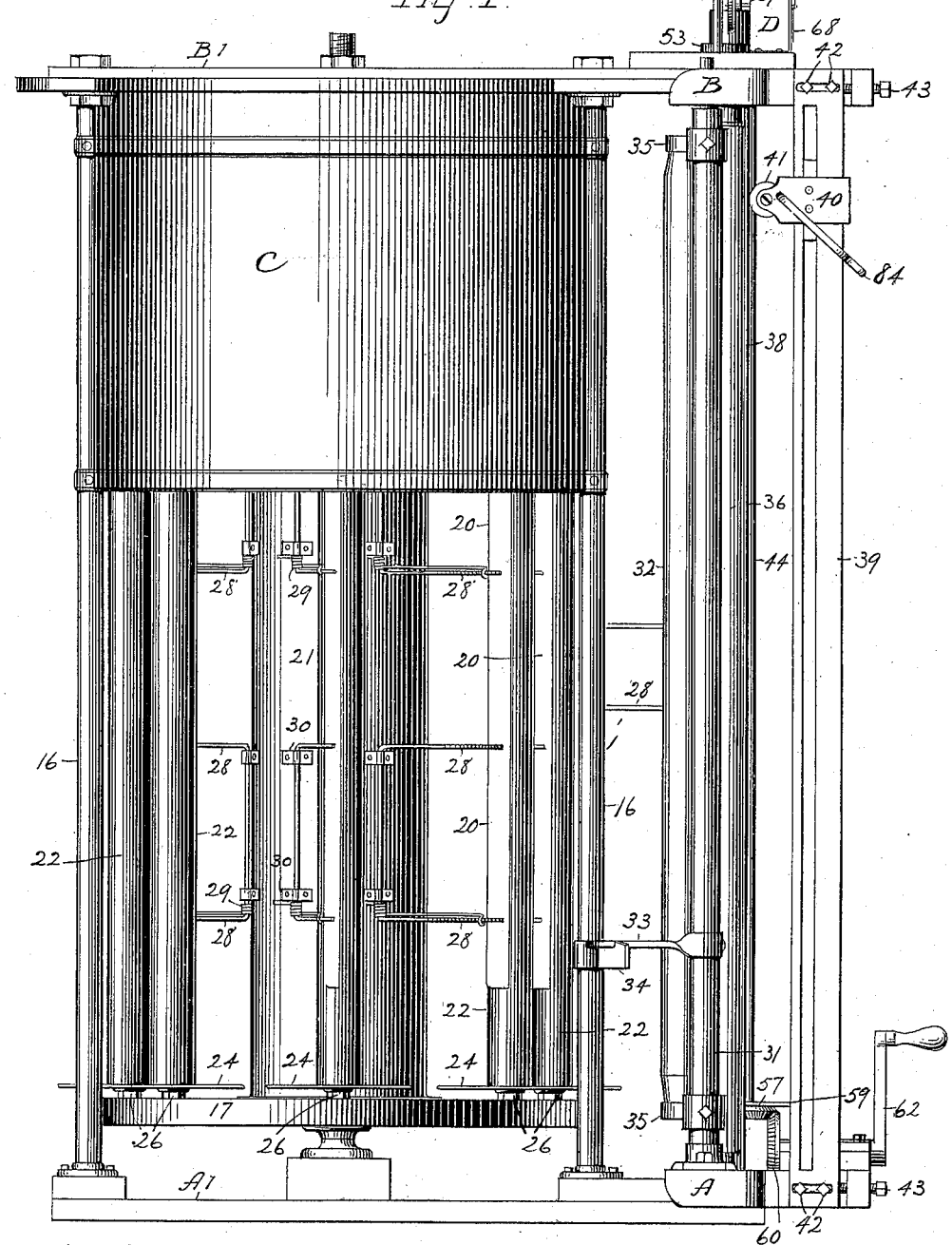
Figures 2, 3:
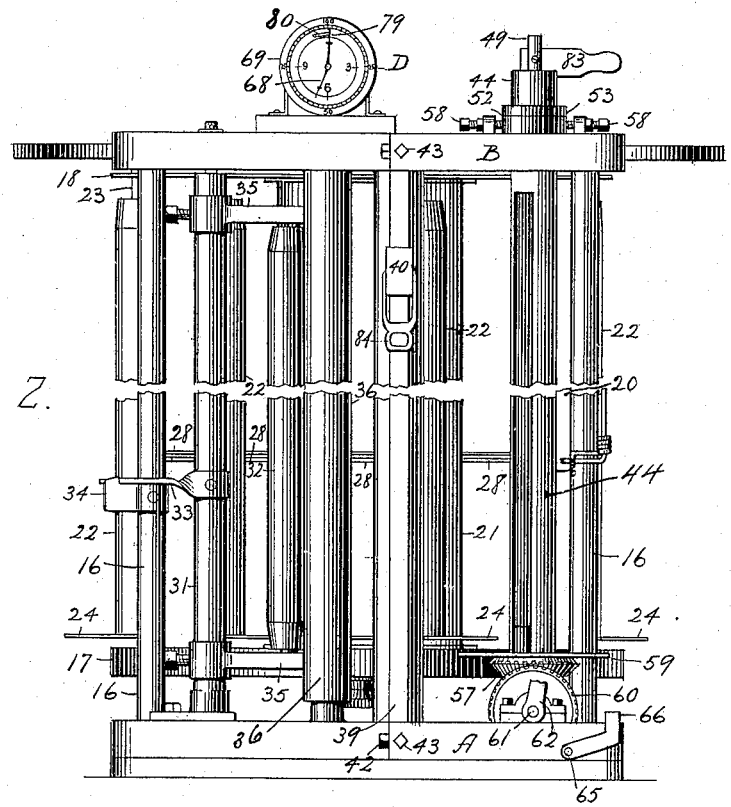

In the accompanying drawings, Figure 1 is a side elevation of my machine. Fig. 2 is a front elevation of the same with a portion broken out and omitted in order to economize space on the drawing. Fig. 3 is a sectional plan view of the same. Fig. 4 is an enlarged detached vertical section, partly in elevation, of the upper end of the winding-roller and its supports, the plane of section extending laterally through the pivotal screws. Fig. 5 is a detached vertical section at the lower end of said roller on the line 5 5 of Fig. 3. Fig. 6 is a horizontal section of the winding-roller. Fig. 7 is a plan of a portion of the disk for the winding-roller, together with a sectional plan of connected parts, on the line 7 7 of Fig. 5. Fig. 8 is a sectional view of the roll-supports together with a side elevation of the ends of one of the rolls upon which the wire-cloth in stock is wound. Fig. 9 is a partial side elevation of one of said rolls and a spring-pressed holder for the wire-cloth when held on said roll. Fig. 10 is a still further enlarged front elevation of the counting or registering mechanism with dial, &c., removed. Fig. 11 is a sectional plan of the same on the line 11 11 of Fig. 10. Fig. 12 is a front elevation of a portion of the registering dial and pointer. Fig. 13 is a plan view of the same. Fig. 14 is a sectional plan of my machine with a modification as to the cutter and presser roller, the scale being the same as in Figs. 1 to 3; and Fig. 15 is an elevation of a portion of said cutter and presser roller when viewed in the direction of the arrow in Fig. 14.

A and B designate, respectively, the base-plate and top plate of the frame for the measuring and cutting apparatus, the said plates being provided with extensions A' and B' for supporting a roll-holder for the stock. Rods or standards 16 connect the top and bottom plates, and with said plates form the frame of the machine. The upper and lower heads 17 and 18 of the roll-holder are supported on suitable pivots and connected by a central shaft 19, Fig. 3, and on said shaft is a support for the spring-pressed holding-arms 20. As shown, said support is in the form of a drum or cylinder 21; but its form is wholly immaterial so long as it furnishes at the proper points the support for the holding-arms 20.

Within the heads of the vertical and revolving roll-holder I place any desired number of stock-rolls 22 for receiving and holding rolls of wire-cloth or other goods in stock ready to be measured and cut off in quantities, as called for from time to time. The upper ends of these stock-rolls are provided with journals 23, which can be slipped into and out of their bearings in the upper head 18, while their lower ends are provided with supporting table-disks 24 and shouldered trunnions 25, Fig. 8, that are received in the bearings 26 of the lower head 17, as shown in Fig. 8, in which it will be noticed that the journals 23 are long enough so that when the rolls are seated in their bearings in the lower head 17 the journals 23 will not withdraw from their bearings in the upper head 18, while at the same time the said rolls are short enough to permit them to be lifted to remove their lower ends from their bearings, and when said lower end is carried outwardly to clear the lower head 17 the roll may be pulled longitudinally out of its bearing in the upper head. This construction permits the ready withdrawal of the rolls for reloading them and the ready replacement of them in the roll-holder when reloaded.

In Fig. 3 I have made broken circles 27 to represent rolls of wire-cloth on the rolls 22, and the spring-pressed holding-arms 20 are represented as pressing on the said wire-cloth to hold it against accidental unwinding. These arms may be of any ordinary construction for analogous uses. They consist of a blade mounted on bails or rods 28, hinged to the drum 21, as at 30, and a spring 29 to force said blades toward the rolls 22.

In Fig. 1 I have shown a hood or guard C at the upper end of the machine between the rods or standards 16 to cover and protect the upper head and upper ends of the rolls therein; but at the rear of the machine the holder and rolls are left exposed for the convenience of reloading the rolls. At the front the holder and rolls are mainly covered by the measuring and cutting-off apparatus.

At the front left-hand corner of the machine is a shaft or pipe 31, hung to partially revolve in suitable bearings, and rigidly mounted thereon are two arms 35, to which a presser-roller 32 is journaled. A lever 33 is also secured to said shaft and arranged for being engaged by a latch 34 on the adjacent corner post or standard 16. Within the path of the presser-roller 32 is a measuring-roller 36, against which the presser-roller is firmly held when the lever 33 is in place by the latch 34, as shown in Figs. 1, 2, and 3. This measuring-roller is mounted to revolve freely in its bearings, and one end—its upper end, as shown—is provided with a beveled pinion 37, Fig. 1, for driving the counting or registering mechanism hereinafter described. Near the measuring-roller 36 is a cutting-bed 38, which I prefer to make in the form of a cylinder, so that it can be turned for bringing a fresh portion of its periphery into working position when desired. In front of this bed 38 is a cutter bar or frame 39, upon which I mount in suitable ways or guides a sliding cutter-frame 40 and rolling cutter 41, Fig. 1. I prefer to mount the cutter-bar adjustably in place, so that it may be moved to and from the bed to make the cutter bear properly thereon for the whole length of said bed. This adjustability may be had by securing the bar on the frame by bolts 42, passing through suitable slots and by a set-screw 43, arranged to bear on the edge of the bar, the same being an ordinary construction in other machines for making similar adjustments.

At one side of and adjacent to the cutting-off mechanism is the hollow winding-roller 44, (see Figs. 2, 3, 4, 5, and 6,) which for convenience of manufacture I prefer to make from a piece of pipe. It is slotted on one side for substantially its whole length. At the lower end is a block 45, (see Figs. 5 and 6,) that fills the pipe and is made fast therein, and on the under side of said block is a squared stud or central projection 46, adapted to be received in a correspondingly-shaped socket and to be revolved by said socket. One side of this block is cut away, as at 47, so as to leave the roller open on one side to its extreme lower end, less the squared stud. The upper end of said pipe is also filled by a block 48, Fig. 5, which is bored centrally to form a bearing for the end 49 of the cam-shaft 50. Instead of journaling this roller directly in the upper plate 18 of the frame, a large hole 51, Fig. 4, is made for said roller through said plate, and two pivotal screws 58 are arranged by the side of said hole upon which to pivot the swinging collar 52, which collar serves the double purpose of a frame for the roller to swing on and as a bearing for the roller to revolve within. The roller just above said collar is provided with a fixed shoulder 53, that rests upon the upper side of the collar 52 at times and prevents said roller from falling down or being pulled through said collar. For convenience of construction I have shown this fixed shoulder as formed of a ring rigidly secured on said roller. The cam-shaft 50 has its journal 54 within the block 45, at the lower end of the roller 44, and is provided on one side with a cam 55 of substantially the length of the cam-shaft. The cam projects sufficiently so that its rounding or beveled side may be forced firmly against the slotted wall of the hollow roller at one side to form a gripping device and so that when turned in the opposite direction its shoulder 56 may strike the opposite wall of the slot in the hollow roller and stop the cam with its gripping-face away from the gripping-jaw of the slot ready to receive the wire-cloth in the gripping-jaws, as shown in Fig. 3. The cam-shaft and cam are turned in the roller 44 by means of a latch-lever 83, that is locked in place when the cam is forced to its work by having its lower edge drop into a notch in the shell of the roller 44.

The lower end of the winding-roller 44 is immediately over the beveled gear 57 properly journaled on the base-plate A and having on its upper side the driving disk or plate 59, within the center of which is a squared socket 64, that receives the squared stud 46 on the lower end of the winding-roller 44, which stud and socket center the lower end of said roller. This beveled gear 57 is driven by the beveled gear 60, the shaft 61 of which is provided with a crank 62. The axis of the beveled gear 57 is bored out to receive a sliding rod 63, the lower end of which rod rests upon the arm 64ª of the rock-shaft 65. The outer end of said rock-shaft is provided with a lever 66, which may be depressed to lift the sliding rod 63 to bring its upper end level with or a little above the top of the disk 59, whereby the winding-roller 44 may be lifted far enough to withdraw the squared stud 46 out of the socket 64 and permit the lower end of said roller to be pulled forward and entirely away from the said disk, when said roller will swing on and be supported by its pivotal screws 58.

The beveled pinion 37 on the upper end of the measuring-roller 36 engages the beveled wheel 66 of the counting or registering mechanism D. Said wheel is on the shaft 67, that carries the pointer 68 to register inches on the dial 69. Said shaft also carries a pinion 70, engaging with a similar pinion 71, that drives the wheel 72 on the shaft 73. A pinion 74 on this shaft 73 engages the wheel 75, which carries a pinion 76, that engages and drives the wheel 77 on the socket 78, which socket carries the pointer 79, that registers feet on the dial. The pointers are not shown in Figs. 10 and 11. They are attached to the socket and shaft by spring-sockets, so that they may slip for changing their position on the socket or shaft, while at the same time they are held in place with sufficient friction to be carried with said socket and shaft. The dial 69 is provided with a spring-stop 80, set on an incline, as shown in Fig. 13, so that it will yield and let the pointer pass when said pointer is moving in a forward direction and so as to stop the said pointer at a certain point when it is moved backwardly. As my machine herein shown is arranged the stop should arrest the backward movement of said pointer when it registers or indicates half a foot on the dial.

The several rolls 22 of the revolving holder may be loaded with different kinds of wire-cloth or wire-cloth of different widths. The winding-roller 44 should be set with its open slot nearly toward the front. The presser-roll 32 is released by disconnecting its lever 33 from the latch, when said roller may be thrown back away from the measuring-roller, as indicated by broken lines in Fig. 3. The revolving holder can be revolved to bring the roll 22 that carries the desired wire-cloth to the front, when the end of the cloth will be unrolled, passed around the measuring-roll, between the cutting-bed 38 and cutter-bar 39, and its end passed in between the jaws of the winding-roller 44, as indicated by the broken lines 81 and 82 in Fig. 3. The cam 55 is then turned by means of the latch-lever 83 to force the cam upon the wire-cloth and grip it firmly, and then the cam is locked to the roller 44 against independent rotation by forcing its lower edge into a notch in the upper end of said roller, as shown in Figs. 2 and 4. The presser-roller 32 is then forced against the wire-cloth on the measuring-roller and locked in place by the lever 33 and latch 34. In the machine shown there is six inches of wire-cloth extended beyond the cutting-point of the cutter 41, and therefore the inch-pointer 68 is set on the dial to indicate six inches, and the feet-pointer 79 is brought back against its stop, so that it indicates half a foot—that is, half of one of the graduations on the outer circle of the dial. The winding-roller is now turned by means of the crank to draw the wire-cloth from the roll 22 and wind it on the roll 44 until the dial registers the desired length of wire-cloth. The cutter-carriage 40 is now moved along on the cutter-bar 39 to carry the roller-cutter over the cutter-bed and cut off the wire-cloth at that point. The cutter-carriage may be pulled down by means of the handle 84. The brake or holder 20, which bears on the wire-cloth of the winding-roller 44, will prevent the cloth thereon from unwinding. The short length that projects from the winding-roller when the wire-cloth is first cut may be wound around the roll by hand, or a slight turn of the winding-roller may be given through the crank to shorten up the projecting end. The cloth thus wound on the roll may be tied to prevent unwinding after removal. The lever-latch 83 is then lifted to release it from the winding-roller 44 and is turned to move the cam for releasing its hold on the wire-cloth, and then the roll 44 and wire-cloth thereon are lifted by means of the lever 65 and rock-shaft to disengage the lower end of the winding-roll from its driving-socket. The lower end of said roll can then be swung forwardly and the wire-cloth slipped off from its lower end. The slabbing off of the block 45 on one side, as at 46, leaves the roller open to its extreme lower end, (less the squared stud,) so that the end of the wire-cloth that was gripped within the roller may readily pass out at said lower end. The winding-roller is best driven in a direction to carry the gripped end of the wire-cloth forwardly instead of backwardly, and thereby the inner end of the wire-cloth conforms to the rest of the roll and is free from all abrupt bends or kinks.

It should be noted that the measuring and cutting-off mechanism may be used independently of the revolving holder for the rolls. For example, that portion of the machine which is within the top and bottom plates B A without their extensions may be used to take goods from the roll when the roll is brought to the machine or the machine is brought to the roll. In Fig. 14 I show a sectional plan of such portion of the machine; but I have also shown therein a different cutter. In this construction 85 designates a fixed shear-blade and 86 a swinging shear-blade acting in connection therewith. This blade, by means of suitable arms 87, (see also Fig. 15,) is mounted on the shaft 88 and may be operated by the lever 89. I also mount the arms 35 of the presser-roller 32 on the same shaft, but leave them loose thereon instead of rigid, so that the shear-blade 86 may have a greater range of motion than the said presser-roller, and I force said presser-roller to its work by means of a spring 90 on one of the arms 87 of the moving shear-blade, so that when said shear-blade is swung back and locked by the latch 91, as shown in Fig. 14, the presser-roller is held into engagement with the measuring-roller 36. The position of the presser-roller 32 and shear 86 when released from the latch 91 and moved forward is indicated by broken lines in Fig. 14.

I have described the cutting mechanism of Figs. 14 and 15 and the counting and registering mechanism in order to disclose an operative machine; but in their general construction they are both old in other machines, and, if desired, other known mechanisms for the same purpose may be substituted therefor as equivalents. While the counting or registering mechanism is a convenience, it should be noted that the measuring-roller is operative without the same, as the user can tell the amount measured off by merely counting the revolutions of said roller. As shown, each revolution of the roller measures six inches.

It is apparent that in carrying out my invention some changes from the construction herein shown in addition to the changes above noted may be made, and I would therefore have it understood that I do not limit myself to the exact form shown, but hold myself at liberty to make such changes and alterations as fairly fall within the spirit and scope of my invention.

One important feature of my invention is that it is adapted to handle wire-cloth, carpets, belting, and other goods from a vertically-mounted roll-holder with rolls of stock thereon, whereby a great saving of store-space is made, especially in long rolls, as a twelve-foot roll occupies no more space than does a twelve-inch roll. The vertical position of the machine also makes it much more convenient for the operator, as he can readily gain access to any side of the roll-holder or to the several rollers, and, further, the revolving holder will stay in whatever position it may be set no matter how the weight thereon may be distributed with reference to the axis of said holder, whereas if the roll-holder were placed on a horizontal axis and was weighted more on one side of its axis than on the other it would be difficult to bring and hold any particular roll of stock in the holder into the proper position for feeding it to the measuring-roller.

I claim as my invention—

1. The combination of the revolving holder mounted on a vertical axis and arranged for holding and delivering several rolls of flat stock thereon, the cylindrical measuring-roller, the cylindrical winding-roller, each of said rollers being also mounted on a vertical axis, and cutting-off mechanism located between and parallel to the peripheries of said vertical measuring and winding rollers and adapted to sever the goods when held with their flat sides in a vertical position, substantially as described.

2. The combination of the hollow winding-roller having a slot in one side of its periphery that extends longitudinally through to one extreme end thereof, with a cam inside said roller and in connection therewith forming gripping-jaws for holding the goods to be wound on said roller, the said roller being cut away at one end and leaving an unobstructed passage in the longitudinal direction of said roller for that portion of the goods that is grasped by the said gripping-jaws, substantially as described.

3. The combination of a revolving holder for holding and delivering several vertical rolls of flat stock, the measuring and pressure rollers also mounted on vertical axes, the hollow winding-roller slotted upon one side and mounted on a vertical axis, a cam inside of said roller and in connection therewith forming gripping-jaws for holding the goods to be wound on said roller, driving mechanism for said hollow winding-roller and cutting-off mechanism working between the said measuring and winding rollers, whereby the stock is held for cutting off with its flat sides in a vertical position, substantially as described.

4. The combination of the vertical winding-roller adapted to be disconnected at its lower end, with the collar 52, and pivotal screws at the upper end of said roller upon which screws said collar is hung, whereby the roller may revolve within said collar and may also be swung on said pivotal screws, substantially as described.

5. The combination of the hollow winding-roller with the gripping-cam mounted therein and means for locking said cam to said roller when the cam is in position for gripping the work, substantially as described.

6. The combination of a supporting-frame with the vertical winding-roller having its upper end supported on said frame and free to slide vertically in its bearings, the horizontal driving-disk mounted on said frame at the lower end of said roller, a socket and projection for detachably connecting said roller and disk and necessitating their simultaneous rotation when connected, substantially as described.

7. The combination of the vertical winding-roller the driving-disk to which said roller is detachably connected, and lifting mechanism for raising said roller for detaching, substantially as described.

8. The combination of the winding-roller, the driving gear and disk to which said roller is detachably connected, the sliding rod 63 and mechanism for forcing said rod upwardly to detach said roller from the socket in said disk, substantially as described.

9. The combination of the winding-roller, the driving gear and disk to which said roller is detachably connected, the sliding rod 63 in the axis of said gear and disk, the rock-shaft 65 and its operating-lever 66, substantially as described.

10. The combination of the measuring-roller, with the cutting-off mechanism, the winding-roller, the counting or registering mechanism having dial and pointer, and the spring-stop on the dial for stopping the pointer when turned backwardly in position to indicate the length of goods extended beyond the cutting-off mechanism.

11. A measuring, winding and cutting-off machine for flat goods like wire-cloth, having its measuring and winding rollers mounted on vertical axes and having its cutting-off mechanism arranged to sever the goods from side to side on a vertical line of cut when held with their flat sides in a vertical position, substantially as described.

12. The combination of the revolving holder mounted on a vertical axis and arranged for holding and delivering several vertical rolls of flat stock, as for example wire-cloth, with a cutting-off device arranged to sever the goods by cutting across them on a vertical line, the goods being held with their flat sides in a vertical position, substantially as described.

13. The vertical winding-roller having a shoulder near its upper end, in combination with the swinging frame 52 pivoted to the main frame and within which swinging frame the upper end of said winding-roller has its bearing, substantially as described.

14. The combination of the revolving holder mounted on a vertical axis and arranged for holding and delivering several vertical rolls of flat stock, as for example wire-cloth, with the measuring-roller 36, the swinging pressure-roller 32 mounted to swing to and from said measuring-roller, means for locking said pressure-roller in engagement with said measuring-roller, a winding-roller for drawing the goods through said measuring and presser rollers and cutting-off mechanism located between the said winding and measuring rollers, all combined for taking a vertical roll of flat stock from its holder, measuring, winding, and cutting off a portion thereof, and releasing the end of the stock-roll which remains in the revolving holder, substantially as described.

15. The combination of the winding-roller, the cutting-off mechanism, a measuring-roller, the counting or registering mechanism having a dial, pointer-shaft and pointer provided with a slipping frictional device to permit the pointer to be turned independently of its shaft, continuously-intermeshing gearing for driving said pointer-shaft, and the spring-stop on the dial for setting the pointer when turned backwardly to indicate on the dial the length of goods between the said winding-roller and the said cutting-off mechanism, substantially as described.

16. The combination of the winding-roller having a peripheral shell longitudinally slotted upon one side in combination with a cam mounted therein and having a rounded face adapted for engaging the inner concentric wall of said shell the space between the inner wall of said shell and rounded face of the cam extending circumferentially whereby the gripped end of the wire-cloth is curved in conformity to the rest of the roll and is free from all abrupt bends or kinks, substantially as described.

17. The combination of the revolving holder mounted on a vertical axis and arranged for holding and delivering several vertical rolls of flat stock, as for example wire-cloth, with a vertical winding-roller, the cutter-bed arranged vertically between said winding-roller and revolving holder, the vertical cutter-bar parallel thereto, the sliding cutter-frame mounted on said vertical cutter-bar and the rolling cutter mounted in said frame for bearing on said bed for traversing vertically over the same, substantially as described.

18. The combination of the tubular winding-roller having a peripheral shell longitudinally slotted upon one side, with a cam mounted therein and having an eccentric and rounded face adapted for engaging the inner concentric wall of said shell, and a device mounted on one end of said cam beyond the end of said winding-roller for operating said cam within the said roller, substantially as described.

19. The combination of the tubular roller slotted on one side, with the cam 55 mounted therein, and having the radial shoulder 56 projecting within the slot of said roller beyond the inner diameter thereof for acting on one radial side wall of the slot as a stop, the projecting face of the cam on the side opposite the said shoulder being rounded off and reduced in size to extend into the unslotted portion of the said roller and act as a gripping-jaw in connection with the inner concentric wall of the said slotted roller adjacent to the slot thereof, substantially as described.

20. The combination of the measuring-roller 36 with the tubular winding-roller 44 slotted longitudinally at one side, the gripping-cam 55 mounted within said roller, and having the shoulder 56 and the eccentric rounded face opposite the said shoulder, whereby when the said cam is turned backwardly to open the gripping-jaws formed by said cam and roller the slot in the roller is closed on one side by the said cam and opened tangentially on the other side and in alinement with the goods as delivered from the said measuring-roller, substantially as described.

21. The combination of the tubular winding-roller slotted upon one side, with the cam mounted in the said roller, a device for operating the said cam within the said roller, and means for positively locking the said operating device to the said roller, substantially as described.

22. The combination of the tubular winding-roller slotted longitudinally at one side and vertically mounted, a cam eccentrically mounted within the said roller, means located near the upper end of said roller for pivoting the said winding-roller and cam for swinging bodily together transversely to their axis, means located at the upper end of the said cam for operating the said cam within the said roller, and means for connecting and disconnecting the lower end of said roller from its bearings, the longitudinal slot in said roller extending through to the extreme lower end thereof, substantially as described.

23. The combination of the cutting-bed extending longitudinally of the frame and supported thereby, with the rectangular cutter-bar supported in said frame parallel thereto, a sliding cutter-frame mounted to slide longitudinally on said cutter-bar in ways that hold said frame in a fixed position with reference to its line of travel, and the rolling cutter mounted in said cutter-frame and held by said cutter-frame and ways with the edge of the cutter bearing firmly on said cutter-bed for traveling in a definite path longitudinally over the same, substantially as described.

24. The combination of the cutting-bed 38 in the form of a cylinder extending longitudinally of the frame of the machine and supported thereby, with the cutter-bar supported in said frame parallel thereto, a cutter-frame mounted to slide longitudinally on said bar and guided against rotating thereon by fitting the rectangular faces thereof, and a rolling cutter in said cutter-frame held thereby with its edge bearing on the summit of the said cylindrical cutting-bed, substantially as described.

FREDERICK H. BASCOM.

Witnesses:
JAMES SHEPARD,
A. W. STIPEK.